United States Patent
Yoshizawa

(10) Patent No.: US 9,880,969 B2
(45) Date of Patent: Jan. 30, 2018

(54) COMPUTING DEVICE AND STORAGE MEDIUM CONTAINING PROGRAM THEREFOR

(71) Applicant: CASIO COMPUTER CO., LTD., Tokyo (JP)

(72) Inventor: Hiroaki Yoshizawa, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 223 days.

(21) Appl. No.: 14/659,177

(22) Filed: Mar. 16, 2015

(65) Prior Publication Data

US 2015/0269113 A1    Sep. 24, 2015

(30) Foreign Application Priority Data

Mar. 20, 2014  (JP) .................................. 2014-057497

(51) Int. Cl.
G06F 15/04    (2006.01)
G06F 15/02    (2006.01)

(52) U.S. Cl.
CPC ................................ *G06F 15/0225* (2013.01)

(58) Field of Classification Search
CPC .................................................. G06F 15/0225
USPC .................................. 708/130–146, 160–162
See application file for complete search history.

(56) References Cited

U.S. PATENT DOCUMENTS

| | | | | |
|---|---|---|---|---|
| 5,189,633 A | * | 2/1993 | Bonadio | G06F 3/033 708/142 |
| 5,377,130 A | * | 12/1994 | Frank | G06F 15/02 708/142 |
| 5,432,721 A | * | 7/1995 | Satoh | G06F 15/0225 708/168 |

(Continued)

FOREIGN PATENT DOCUMENTS

| | | |
|---|---|---|
| JP | H4-188380 A | 7/1992 |
| JP | 2000-194663 A | 7/2000 |
| JP | 2011-204187 A | 10/2011 |

OTHER PUBLICATIONS

Office Action dated Aug. 29, 2017, issued in corresponding Japanese Patent Application 2014-057497 and English translation of the same. (14 pages).

*Primary Examiner* — Tan V. Mai
(74) *Attorney, Agent, or Firm* — Fitch Even Tabin & Flannery LLP

(57) ABSTRACT

A computing device includes a processor to perform a coefficient calculation control for (i) displaying a mathematical formula including a coefficient on a display unit, (ii) displaying the coefficient name, and (iii) receiving a coefficient value to calculate the mathematical formula; and a regression calculation control for storing numeric data sets of independent and dependent variables in a memory and calculating a value of a coefficient in a regression formula representing the relationship between the independent and dependent variables based on the numeric data sets. The coefficient calculation control performs a coefficient value (Continued)

displaying control for displaying the value of the coefficient in the regression formula calculated through the regression calculation control and performs a post-regression calculation control for using the regression formula as the mathematical formula to calculate the mathematical formula using the displayed coefficient value.

20 Claims, 9 Drawing Sheets

(56) References Cited

U.S. PATENT DOCUMENTS

| | | | | |
|---|---|---|---|---|
| 5,532,946 | A * | 7/1996 | Phipps | G06F 15/0225 345/440.1 |
| 5,535,317 | A * | 7/1996 | Tanaka | G06F 15/025 345/440 |
| 6,549,923 | B1 * | 4/2003 | Sudoh | G09B 23/02 708/162 |

* cited by examiner

COMPUTING DEVICE AND STORAGE MEDIUM CONTAINING PROGRAM THEREFOR

CROSS-REFERENCE TO RELATED APPLICATION

This application is based upon and claims the benefit of priority from the prior Japanese Patent Application No. 2014-057497, filed on Mar. 20, 2014, the entire contents of which are incorporated herein by reference.

BACKGROUND OF THE INVENTION

1. Field of the Invention

The present invention relates to a computing device capable of displaying at least the values of variables and a storage medium containing a program therefor.

2. Description of Related Art

A typical known scientific electronic calculator having a regression calculation function can regression-calculate values of coefficients included in a selected regression formula based on numeric data sets of an independent variable X and a dependent variable Y. One of the values of the independent variable X and the dependent variable Y in the regression formula can then be inputted for calculation of the other as an estimated value using the values of the coefficients obtained through the regression calculation.

For example, Patent Literature 1 (Japanese Unexamined Patent Application Publication No. 2000-194663) discloses a technique capable of easily specifying the most accurate regression for collected data in various regression types, such as linear regression, quadratic regression, logarithmic regression, exponential regression, and power regression, in addition to the above standard regression calculation function.

Unfortunately, such a known scientific electronic calculator cannot allow a user to recheck the selected regression formula through simple operations after the operation for displaying the values of the coefficients obtained through regression calculation in the regression formula. In addition, a user cannot readily obtain the estimated value with the comprehension of the relationship between the selected regression formula, the values of the coefficients obtained through the regression calculation, the inputted variable, and the estimated value of the corresponding variable since the operation for displaying the values of the coefficients regression-calculated in the regression formula is separated from the operation for calculating the estimated value of the variable.

SUMMARY OF THE INVENTION

It is an object of the present invention to provide a computing device that allows a user to recheck the selected regression formula through simple operations after a regression calculation and that allows a user to obtain the estimated value with the comprehension of the relationship between the selected regression formula, the values of the coefficients obtained through the regression calculation, the inputted variable, and the estimated value of the corresponding variable, and a storage medium containing a program therefor.

According to one aspect of the present invention, there is provided a computing device including a display unit, a memory, and a processor, the processor performing: a coefficient calculation control for (i) displaying a mathematical formula including a coefficient on the display unit, (ii) displaying a name of the coefficient included in the mathematical formula on the display unit, and (iii) receiving input of a value of the coefficient included in the mathematical formula, the value corresponding to the name of the coefficient, to calculate the mathematical formula; and a regression calculation control for storing numeric data sets of an independent variable and a dependent variable in the memory and calculating a value of a coefficient in a regression formula representing a relationship between the independent variable and the dependent variable based on the numeric data sets, wherein the coefficient calculation control performs a coefficient value displaying control for displaying the value of the coefficient in the regression formula calculated through the regression calculation control and performs a post-regression calculation control for using the regression formula as the mathematical formula to calculate the mathematical formula using the value of the coefficient displayed by the coefficient value displaying control.

According to another aspect of the present invention, there is provided a computing device including a display unit, a memory, and a processor, the processor performing: a solution calculation control for (i) displaying an equation including an independent variable and a dependent variable on the display unit and (ii) receiving a value of the dependent variable inputted through a user operation to calculate a value of the independent variable for the equation; and a regression calculation control for storing numeric data sets of the independent variable and the dependent variable in the memory and calculating a value of a coefficient in a regression formula representing a relationship between the independent variable and the dependent variable based on the numeric data sets, wherein the solution calculation control performs a coefficient value displaying control for displaying the value of the coefficient in the regression formula calculated through the regression calculation control and performs a post-regression solution calculation control for using the value of the coefficient displayed by the coefficient value displaying control and receiving the value of the dependent variable inputted through a user operation to calculate the value of the independent variable corresponding to the value of the dependent variable for the regression formula.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein.

DETAILED DESCRIPTION OF THE INVENTION

Embodiments according to the present invention will now be described in detail with reference to the accompanying drawings. The scope of the invention however should not be limited to the illustrated embodiments.

[Appearance Configuration]

Figure 1:
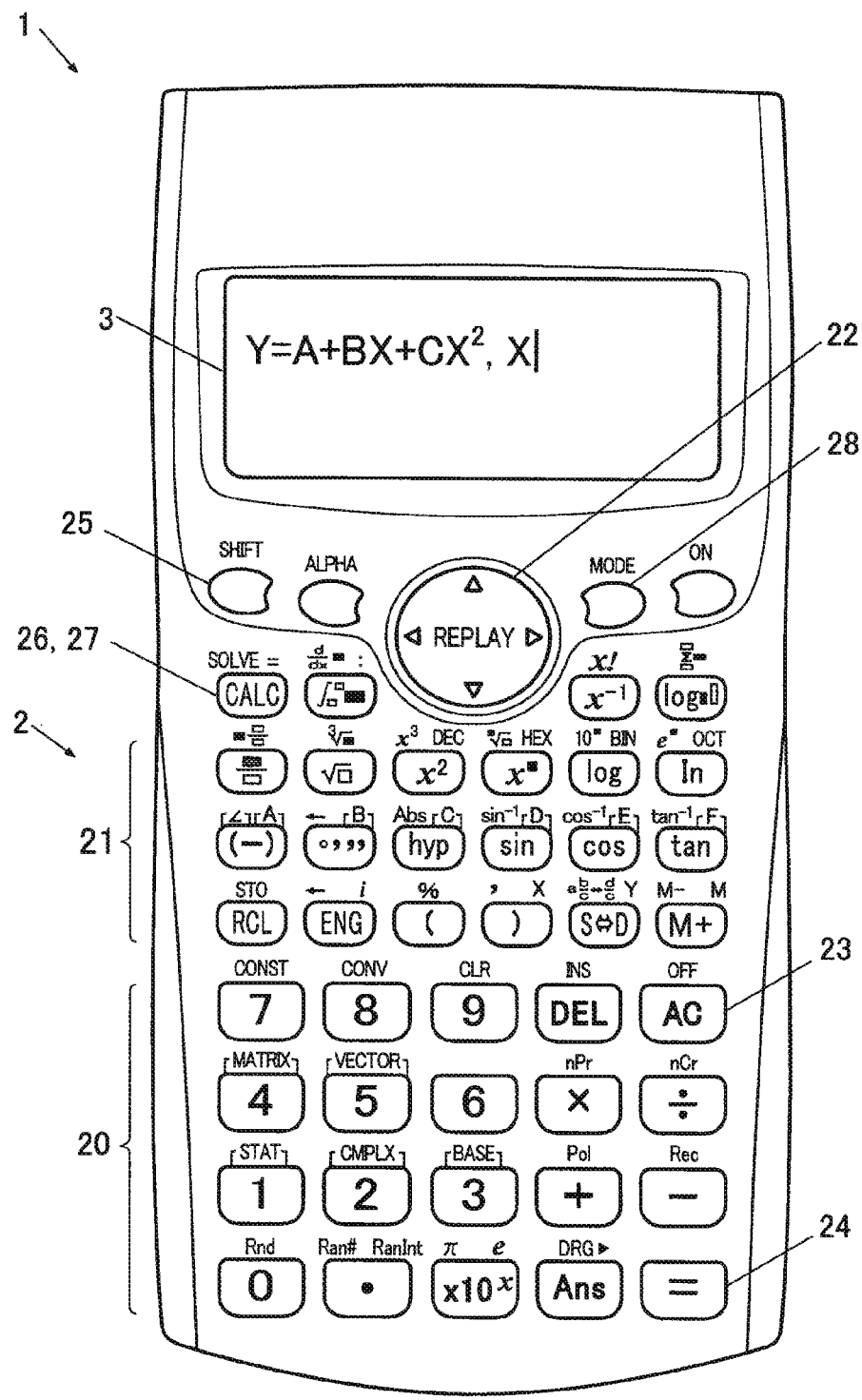
FIG. 1 is a plan view illustrating a schematic configuration of a scientific electronic calculator.

FIG. 1 is a plan view illustrating a schematic configuration of a scientific electronic calculator 1 to which a computing device according to the present invention is applied.

As illustrated in FIG. 1, the scientific electronic calculator 1 has an input key group 2 consisting of various types of keys and a display 3.

The input key group 2 receives the input operation of mathematical formula elements, such as numerals and arithmetic operation symbols by a user, and the operations of various processing commands, and consists of a plurality of keys which have their unique assigned functions.

In the present embodiment, the input key group 2 includes, for example, numerical keys 20, arithmetic operation symbol keys 21, a cursor key 22, an "AC" key 23, and an "=" key 24, a "SHIFT" key 25, a "CALC" key 26, and a "MODE" key 28.

Among these keys, the numerical keys 20 receive the input operations of numerical values, and the arithmetic operation symbol keys 21 receive the input operations of various arithmetic operation symbols, such as symbols and brackets for four arithmetic operations, a fraction bar, a root sign ($\sqrt{\ }$), logarithmic symbols, and trigonometric symbols.

The cursor key 22 is pressed to move a cursor, which indicates a position to be edited or a position to be selected, in a predetermined direction on the display 3, for example. The cursor key 22 can receive inputs in four directions of up, down, left and right in the present embodiment.

The "AC" key 23 receives the power-on operation.

The "=" key 24 receives the input operation of an execution command or a determination command of processing, and functions as a key for commanding the execution of an arithmetic process after the input of a mathematical formula, for example.

If the "SHIFT" key 25 is pressed and then the numerical keys 20 and the arithmetic operation symbol keys 21 are pressed, functions or content indicated above the keys 20 and 21 are inputted.

The "CALC" key 26 receives an execution command of a CALC function (the starting operation of calculation of coefficients). The "CALC function" refers to a function to receive input of a mathematical formula including coefficients and variables and to calculate a value obtained by substituting a specific value for a variable used in the mathematical formula. The "CALC function" can continuously obtain the solutions of a mathematical formula while various values are substituted.

If the "SHIFT" key 25 is pressed and then the "CALC" key 26 is pressed, the "CALC" key 26 functions as a key ("SOLVE" key 27) receiving an execution command of a SOLVE function (the starting operation of calculation of a solution). The "SOLVE" function refers to a function to obtain an approximate solution of an inputted equation through Newton's method.

The "MODE" key 28 is used to select a calculation mode of the scientific electronic calculator 1. The calculation mode is selected from, for example, normal calculation (COMP), complex calculation (CMPLX), regression calculation (STAT), base-n calculation (BASE-N), equation calculation (EQN), and matrix calculation (MATRIX).

The display 3 includes, for example, a liquid crystal display (LCD) or an electronic luminescent display (ELD). The display 3 displays various pieces of data required for the operation of the scientific electronic calculator 1, as well as characters, signs, mathematical formulae and the result of an arithmetic operation, for example, in response to the operation of the input key group 2 or any other key.

[Functional Configuration]

The functional configuration of the scientific electronic calculator 1 will now be described.

Figure 2:
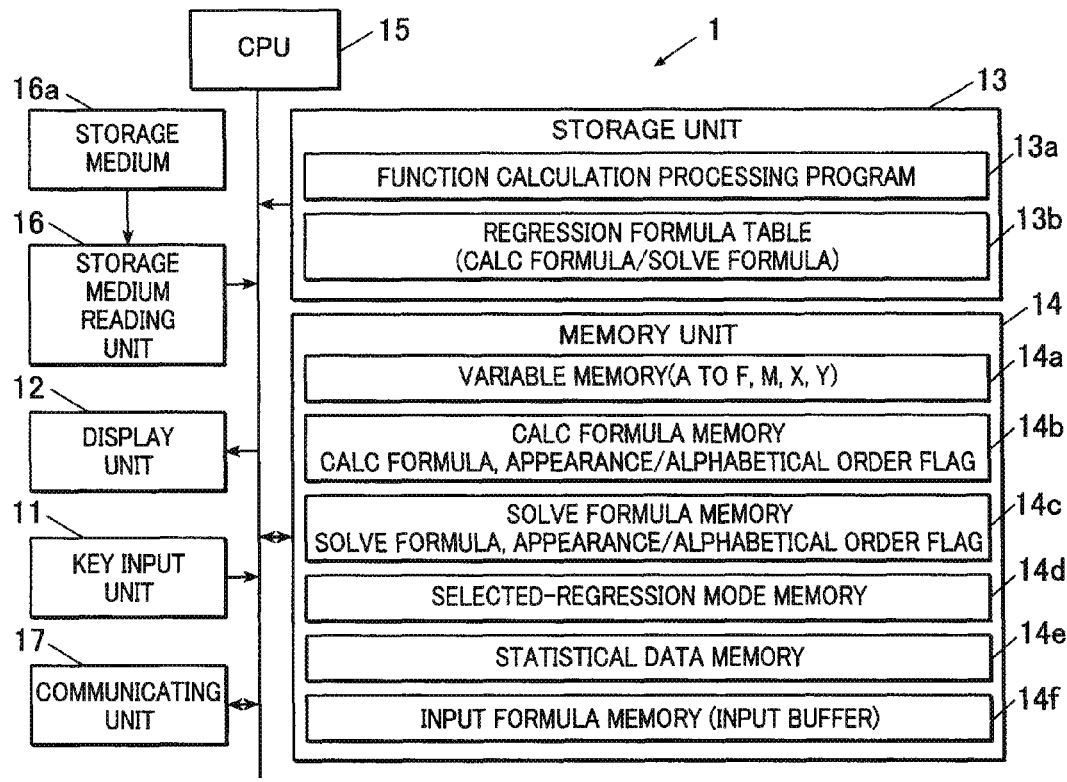
FIG. 2A is a schematic block diagram illustrating a functional configuration of the scientific electronic calculator.
FIG. 2B illustrates specific data in a regression formula table of the scientific electronic calculator.
FIG. 2C illustrates specific data in a statistical data memory of the scientific electronic calculator.

FIG. 2A is a schematic block diagram illustrating a functional configuration of the scientific electronic calculator 1.

As illustrated in FIG. 2A, the scientific electronic calculator 1 includes a key input unit 11, a display unit 12, a storage unit 13, a memory unit 14, a central processing unit (CPU) 15, a storage medium reading unit 16, and a communicating unit 17.

The key input unit 11 includes the input key group 2 and outputs an operational signal in response to a pressed key to the CPU 15.

The display unit 12 includes the display 3, and displays various pieces of information on the display 3 in response to a signal from the CPU 15.

The storage unit 13 is a nonvolatile memory, which is composed of, for example, a read only memory (ROM), and stores various programs and various pieces of data. More specifically, the storage unit stores a function calculation processing program 13a according to the present invention and a regression formula table 13b.

The function calculation processing program 13a causes the CPU 15 to execute the function calculation process (see FIGS. 3 to 5) described below.

The regression formula table 13b stores types of regression formulae associated with the relationships between coefficients and variables in the respective regression formulae. With reference to FIG. 2B, for example, the regression formula table 13b stores seven types of regression formulae associated with respective relational formulae of coefficients (A, B, C) and a variable (X) for the execution of the CALC function and respective relational formulae of coefficients (A, B, C) and variables (X, Y) for the execution of the SOLVE function.

The memory unit 14 is a volatile memory (for example, a random access memory (RAM)) for storing information temporarily, and includes multiple work areas to store, for example, various programs to be executed and data related to these programs. The memory unit 14 in the present embodiment includes, for example, a variable memory 14a, a CALC formula memory 14b, a SOLVE formula memory 14c, a selected-regression mode memory 14d, a statistical data memory 14e, and an input formula memory 14f (input buffer).

The variable memory 14a stores variables and coefficients of a mathematical formula.

The CALC formula memory 14b stores a regression formula (CALC formula in FIG. 2B) including coefficients and a variable corresponding to the regression type. The CALC formula memory 14b stores a flag indicating a coefficient display mode of the regression formula, i.e., indicating whether the coefficients are displayed in the appearance order or the alphabetical order.

The SOLVE formula memory 14c also stores a regression formula (SOLVE formula in FIG. 2B) including coefficients and variables corresponding to the regression type, and a flag indicating whether the coefficients are displayed in the appearance order or the alphabetical order.

The selected-regression mode memory 14d stores a selected regression mode indicating whether the CALC or SOLVE function is executed in the function calculation process.

With reference to FIG. 2C, the statistical data memory 14e stores, for example, an independent variable (X) and a dependent variable (Y), which are inputted by a user and associated with each other.

The input formula memory 14f receives key data corresponding to a pressed key and stores the key data in the input order.

The CPU 15 comprehensively controls each unit of the scientific electronic calculator 1. More specifically, the CPU 15 expands a selected program among system programs and various application programs stored in the storage unit 13, in the memory unit 14, and executes various processes in collaboration with the program expanded in the memory unit 14.

The storage medium reading unit 16 reads information from and stores it onto a storage medium 16a such as an SD card.

The communicating unit 17 can communicate with a personal computer or another scientific electronic calculator 1.

[Operation of Scientific Electronic Calculator]

Figure 3:
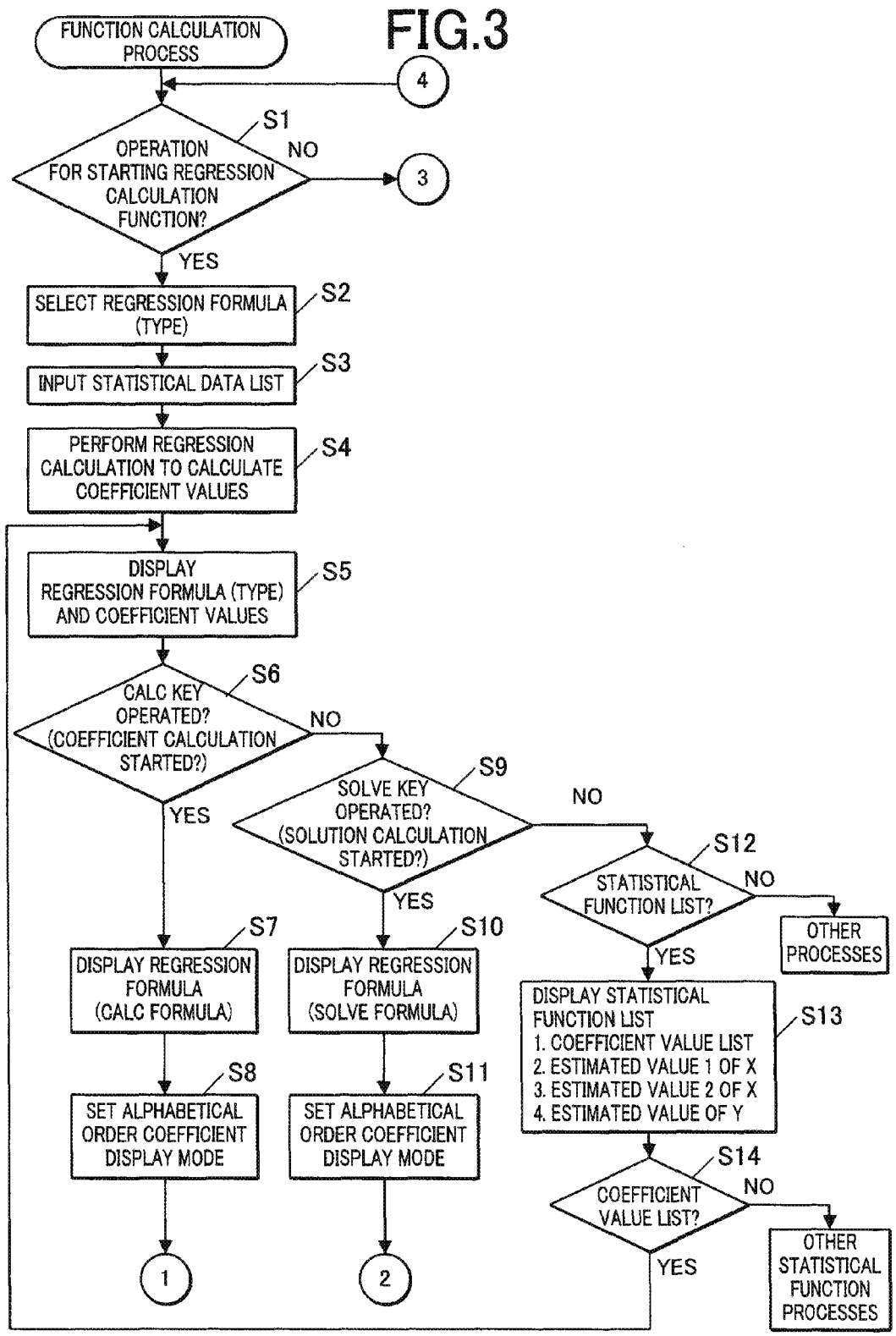
FIG. 3 is a flowchart illustrating a function calculation process.
Figure 4:
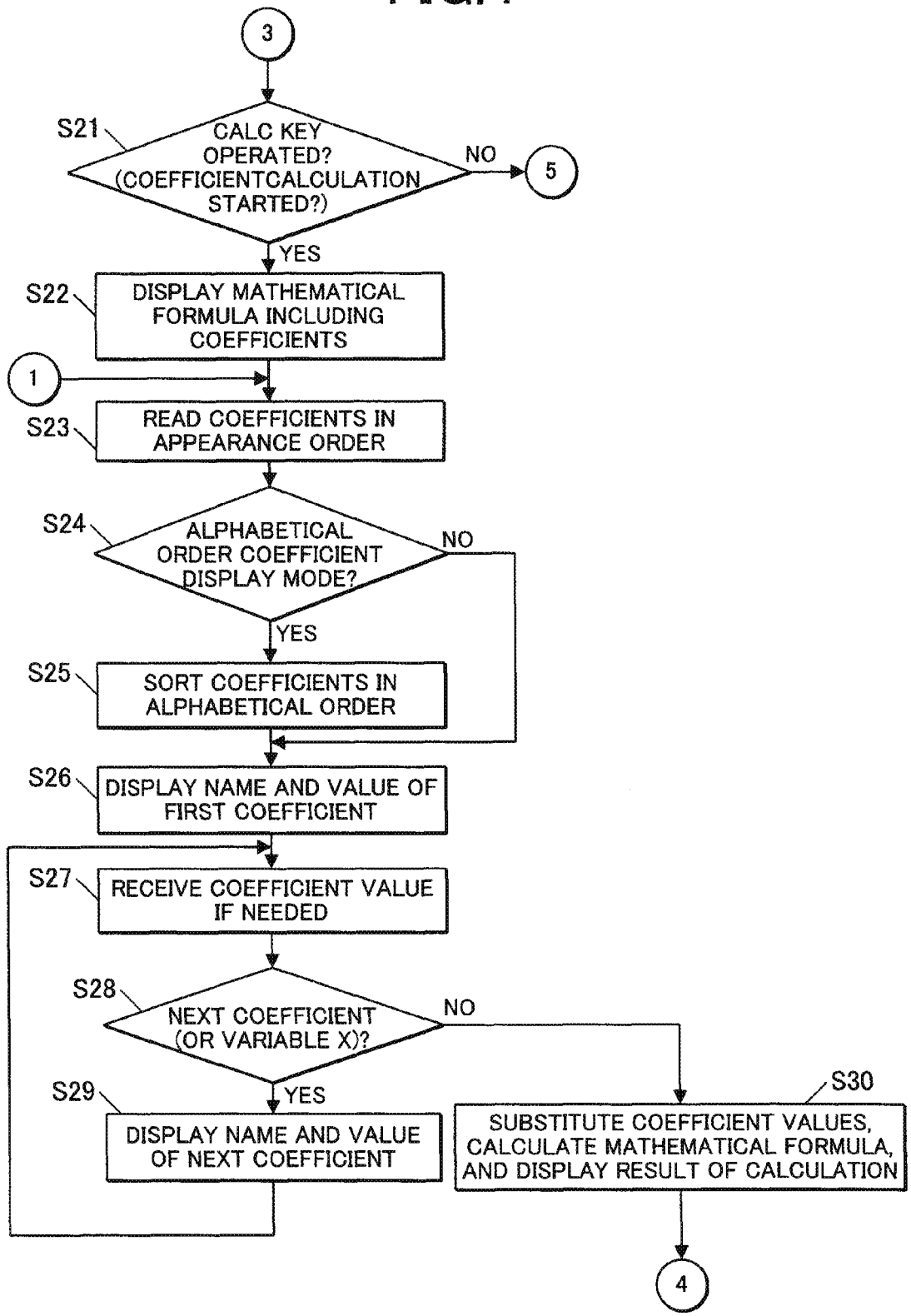
FIGS. 4 and 5 are flowcharts illustrating processes subsequent to FIG. 3.
Figure 5:
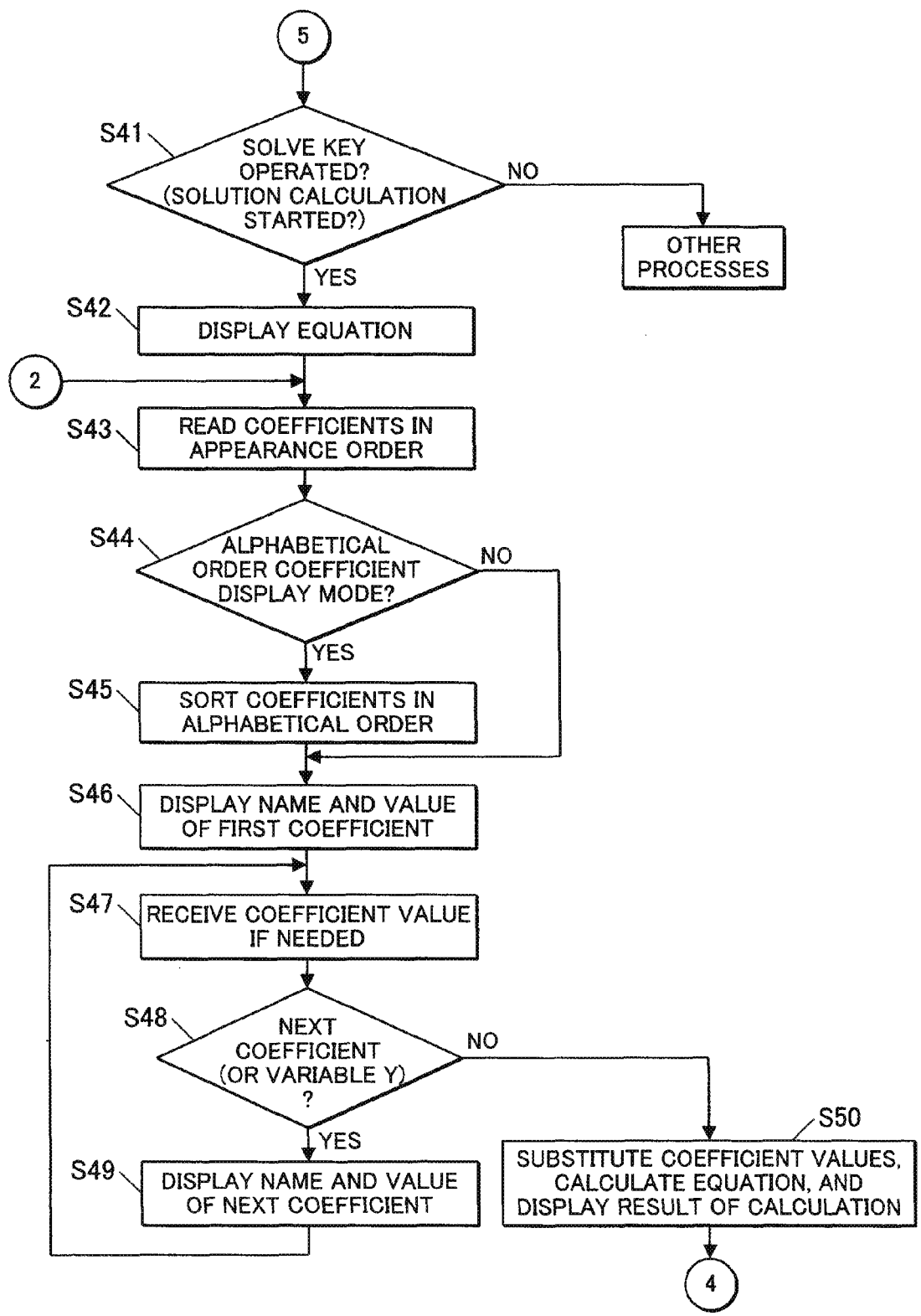

FIGS. 3 to 5 are flowcharts illustrating the operation of the function calculation process.

A user operation through the key input unit 11 causes the function calculation processing program 13a to be read from the storage unit 13 and adequately expanded in the memory unit 14. As a result, the function calculation process is executed through collaboration of the function calculation processing program 13a with the CPU 15. The CPU 15 executes the following steps in the function calculation process on the basis of the function calculation processing program 13a.

As illustrated in FIG. 3, it is determined whether the operation for starting a regression calculation function is performed by the user in Step S1.

If the operation for starting a regression calculation function is performed, a type of regression formula selected by the user is received in Step S2. A statistical data list on the independent variable (X) and the dependent variable (Y) inputted from the user is received and stored in the statistical data memory in Step S3.

In Step S4, the values of the coefficients of the regression formula selected by the user are calculated through regression calculation on the basis of numeric data sets of the independent variable X and the dependent variable Y in the statistical data list in the statistical data memory.

In Step S5, the regression formula selected by the user and the resultant values of the coefficients are displayed on the display 3.

In Step S6, whether the user presses the "CALC" key 26, i.e., whether the operation for starting calculation of the coefficients is performed is determined.

If the operation for starting calculation of the coefficients is performed, the regression formula (CALC formula) selected by the user is read from the regression formula table 13b in the storage unit 13, is stored into the CALC formula memory 14b, and is displayed on the display 3 in Step S7.

In Step S8, an alphabetical order flag in the CALC formula memory 14b is activated to set the coefficient display mode to an alphabetical order coefficient display mode.

If the operation for starting calculation of the coefficients is not performed in Step S6, it is determined whether the user presses the "SOLVE" key 27 as the operation for starting the calculation of a solution in Step S9.

If the operation for starting calculation of a solution is performed, the regression formula (SOLVE formula) selected by the user is read from the regression formula table 13b in the storage unit 13, is stored into the SOLVE formula memory 14c, and is displayed on the display 3 in Step 10.

In Step S11, an alphabetical order flag in the SOLVE formula memory 14c is activated to set the coefficient display mode to an alphabetical order coefficient display mode.

If the operation for starting calculation of a solution is not performed in Step S9, it is determined whether the user performs the operation for displaying a statistical function list in Step S12.

If the operation for displaying the list is performed, the statistical function list is displayed on the display 3 in Step S13. In Step S14, it is determined whether the user selects a coefficient value list. If the coefficient value list is selected, the process returns to Step S5.

If the operation for starting a regression calculation function is not performed in Step S1, whether the user presses the "CALC" key 26, i.e., whether the operation for starting calculation of coefficients is performed is determined in Step S21, as illustrated in FIG. 4.

If the operation for starting calculation of coefficients is performed, a mathematical formula, which is inputted by the user and includes coefficients, is displayed on the display 3 in Step S22.

In Step S23, the coefficients included in the mathematical formula or in the regression formula in Step S7 are read and arranged from the head in the appearance order. In Step S24, it is determined whether the coefficient display mode is set to the alphabetical order coefficient display mode.

If the coefficient display mode is set to the alphabetical order coefficient display mode, the coefficients are sorted in the alphabetical order in Step S25. In Step S26, the name and the value of the first coefficient in the alphabetical order are displayed on the display 3.

If the coefficient display mode is not set to the alphabetical order coefficient display mode, the name and the value of the first coefficient in the appearance order are displayed on the display 3 in Step S26.

If the target of the operation for starting calculation of coefficients is a mathematical formula including coefficients, the name of the first coefficient in the appearance order is displayed on the display 3 in Steps S23 to S26.

If the target of the operation for starting calculation of coefficients is the regression formula in Step S7, the name and the value (the value of the coefficient calculated in Step S4) of the first coefficient in the alphabetical order are displayed on the display 3.

In Step S27, the input of a value of the coefficient is received from the user if needed. In Step S28, it is determined whether there is a next coefficient.

If there is a next coefficient, the name and the value of the next coefficient are displayed on the display 3 in Step S29 and then the process returns to Step S27.

If there is not a next coefficient, in Step S30, the values of the coefficients are substituted for the coefficients of the mathematical formula or of the regression formula in Step S7, the calculation is performed using the coefficients, and the result of the calculation is displayed on the display 3.

If the target of the operation for starting calculation of coefficients is a mathematical formula including coefficients, in Steps S26 to S30, the names of the coefficients are displayed from the head in the appearance order, the input of a value of the coefficient is received from the user every time the name of the coefficient is displayed, and the mathematical formula is calculated using the values of the coefficients.

If the target of the operation for starting calculation of coefficients is the regression formula in Step S7, the names of the coefficients and the values of the coefficients calculated in Step S4 are displayed in the alphabetical order. The independent variable name is then displayed to receive an independent variable value from the user. The dependent variable value is calculated on the basis of the values of the coefficients calculated in Step S4 and the independent variable value inputted by the user.

If the operation for starting calculation of coefficients is not performed in Step S21, it is determined whether the user presses the "SOLVE" key 27 as the operation for starting the calculation of a solution in Step S41 of FIG. 5.

If the operation for starting the calculation of a solution is performed, an equation including the independent variable and the dependent variable inputted by the user are displayed on the display 3 in Step S42.

In Step S43, the coefficients included in the equation inputted by the user or in the regression formula in Step S10 are read and arranged from the head in the appearance order. In Step S44, it is determined whether the coefficient display mode is set to the alphabetical order coefficient display mode.

If the coefficient display mode is set to the alphabetical order coefficient display mode, the coefficients are sorted in the alphabetical order in Step S45. In Step S46, the name and the value of the first coefficient in the alphabetical order are displayed on the display 3.

If the coefficient display mode is not set to the alphabetical order coefficient display mode, the name and the value of the first coefficient in the appearance order are displayed on the display 3 in Step S46.

If the target of the operation for starting the calculation of a solution is an equation inputted by the user, the name of the first coefficient in the appearance order is displayed on the display 3 in Steps S43 to S46.

If the target of the operation for starting the calculation of a solution is the regression formula in Step S10, the name and the value (the value of the coefficient calculated in Step S4) of the first coefficient in the alphabetical order are displayed on the display 3.

In Step S47, the input of a value of the coefficient is received from the user if needed. In Step S48, it is determined whether there is a next coefficient.

If there is a next coefficient, the name and the value of the next coefficient are displayed on the display 3 in Step S49 and the process returns to Step S47.

If there is not a next coefficient, in Step S50, the values of the coefficients are substituted for the coefficients of the equation inputted by the user or of the regression formula in Step S10, the calculation is performed using the coefficients, and the result of the calculation is displayed on the display 3.

If the target of the operation for starting the calculation of a solution is an equation inputted by the user, in Steps S46 to S50, the names of the coefficients are displayed from the head in the appearance order, the input of a value of the coefficient is received from the user every time the name of the coefficient is displayed, the dependent variable name is displayed to receive the input of a dependent variable value from the user, and the independent variable value is calculated based on the values of the coefficients and the dependent variable value inputted by the user.

If the target of the operation for starting the calculation of a solution is the regression formula in Step S10, the names of the coefficients and the values of the coefficients calculated in Step S4 are displayed in the alphabetical order. The dependent variable name is then displayed to receive the input of a dependent variable value from the user. The independent variable value is calculated on the basis of the values of the coefficients calculated in Step S4 and the dependent variable value inputted by the user.

Operational Example 1

Figure 6:
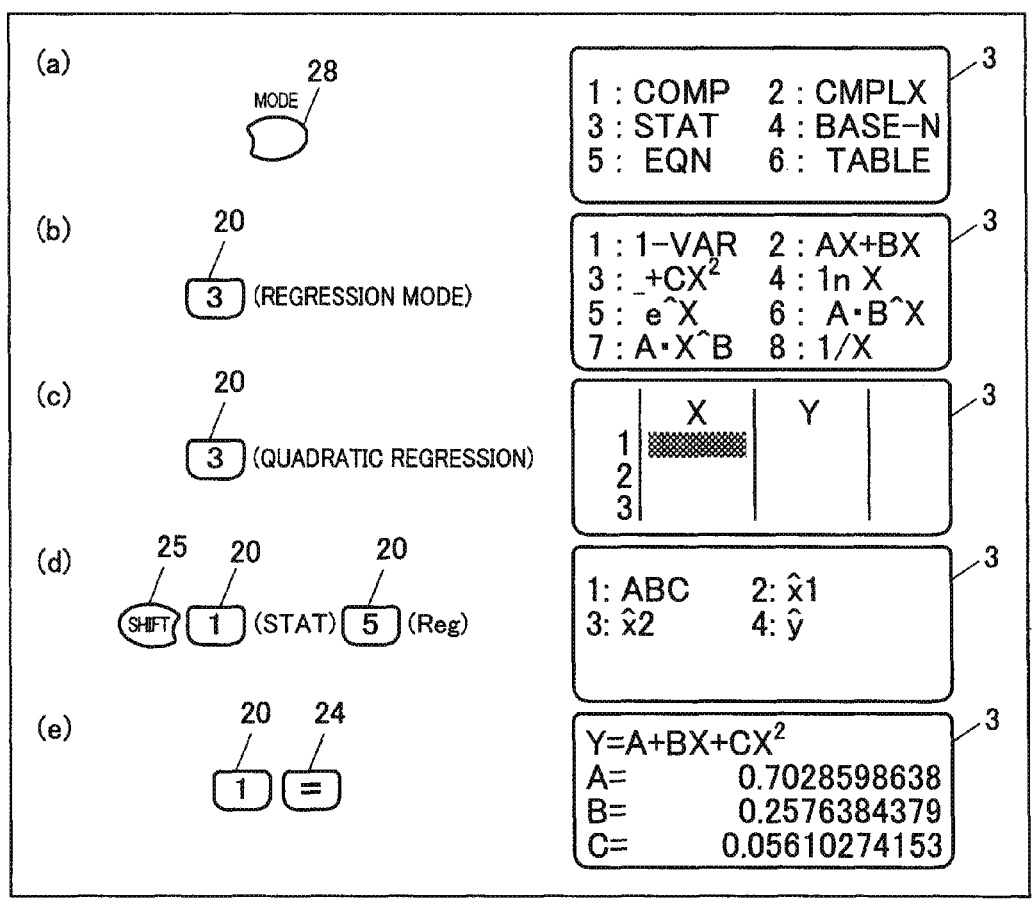
FIGS. 6 to 9 illustrate contents appearing on a display.

With reference to FIG. 6 (*a*), if the user presses the "MODE" key 28, a menu is displayed for selection of a calculation mode from the multiple calculation modes.

If the user then presses the numerical key 20 (3) as the operation for starting the regression calculation function (Step S1), a menu is displayed for selection of a regression formula type from multiple regression formula types as illustrated in FIG. 6(*b*).

If the user then presses the numerical key 20 (3) to select a quadratic regression formula as illustrated in FIG. 6(*c*), the regression formula type inputted by the user is received (Step S2). The statistical data list on the independent variable X and the dependent variable Y inputted by the user is then received (Step S3).

If the user then presses the "SHIFT" key 25, the numerical key 20 (1), and the numerical key 20 (5) in this order as illustrated in FIG. 6(*d*), a menu is displayed for selection of calculation of the values of the coefficients A, B, and C, of the estimated value of the independent variable X, or of the estimated value of the dependent variable Y.

If the user then presses the numerical key 20 (1) and the "=" key 24 in this order as illustrated in FIG. 6(*e*), the values of the coefficients A, B, and C are calculated with the quadratic regression formula based on the statistical data list inputted by the user (Step S4) to display the quadratic regression formula and the values of the coefficients (Step S5).

Figure 7:
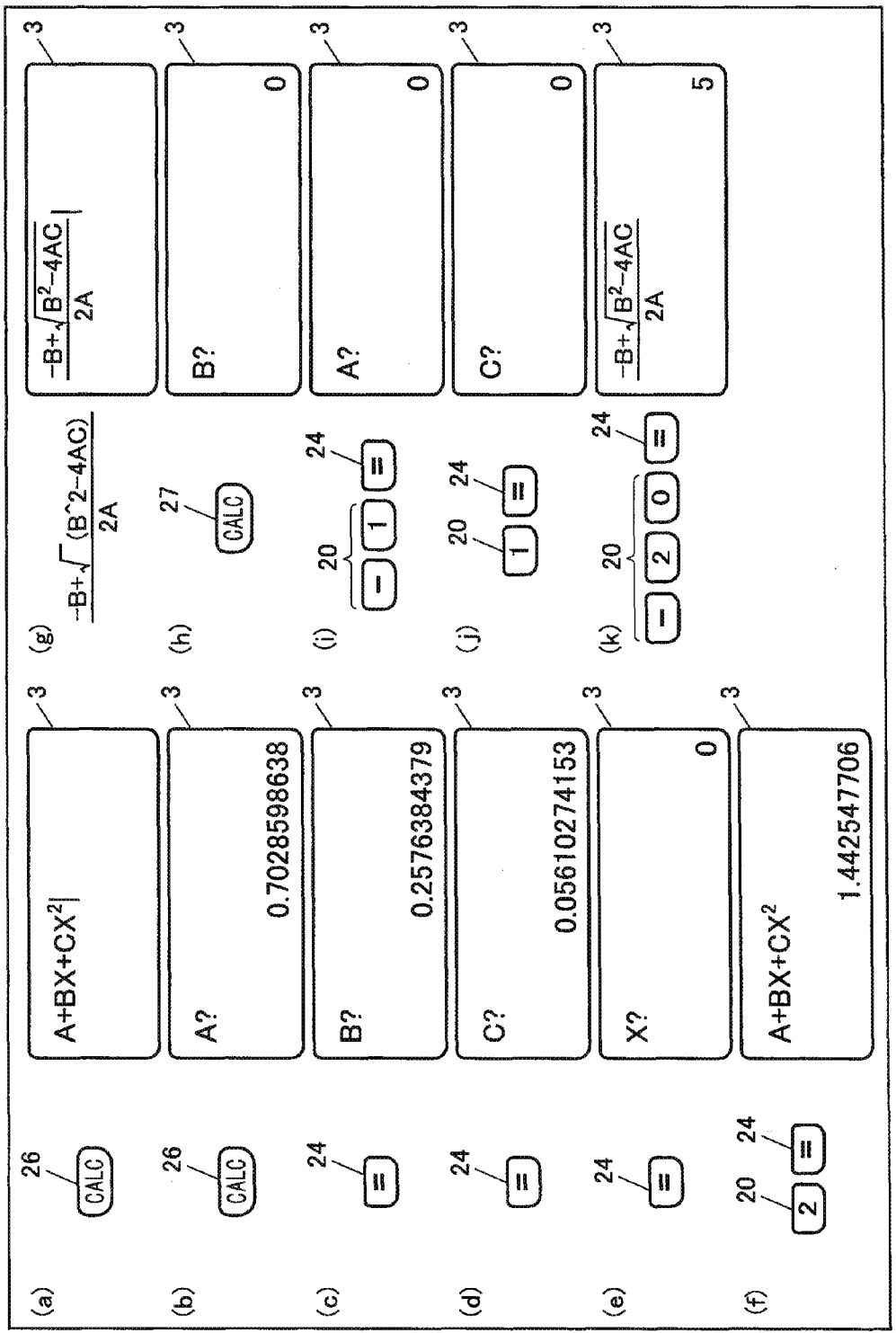

If the user then presses the "CALC" key 26 as the operation for starting the calculation of the coefficients as illustrated in FIG. 7(*a*) (Step S6), the quadratic regression formula selected for the last regression calculation is displayed (Step S7).

If the user presses the "CALC" key 26, the "=" key 24, and the "=" key 24 in this order as illustrated in FIG. 7(*b*) to (*d*), the names and the values of the coefficients A, B, and C are displayed in the alphabetical order (Steps S23 to S29).

If the user then presses the "=" key 24 as illustrated in FIG. 7(*e*), the independent variable name X is displayed (Step S29).

In the operations in FIG. 7(*b*) to (*e*), the menu may be changed automatically on a periodic basis (for example, every two seconds) instead of key operations by the user.

If the user then presses the numerical key 20 (2) and the "=" key 24 in this order as illustrated in FIG. 7(*f*), the input of an independent variable value is received from the user (Step S27). The result of the calculation of the quadratic regression formula is displayed on the basis of the values of the coefficients A, B, and C and the independent variable (Step S30).

If the user presses the "CALC" key 26 as the operation for starting the calculation of the coefficients without performing the operation for starting the regression calculation function (Step S21), a mathematical formula, which has preliminarily been inputted by the user and includes coefficients, is displayed as illustrated in FIG. 7(*g*) (Step S22).

If the user then presses the "CALC" key 26, the numerical key 20 (−1), the "=" key 24, the numerical key 20 (1), the "=" key 24, the numerical key 20 (−20), and the "=" key 24 in this order as illustrated in FIG. 7(*h*) to (*k*), the names of the coefficients A, B, and C are displayed from the head in the appearance order (Steps S23 to S29), and input of a value of the coefficient is received from the user every time the name of the coefficient is displayed (Step S27). The result of the calculation is displayed on the basis of these values of the coefficients (Step S30).

Operational Example 2

Figure 8:
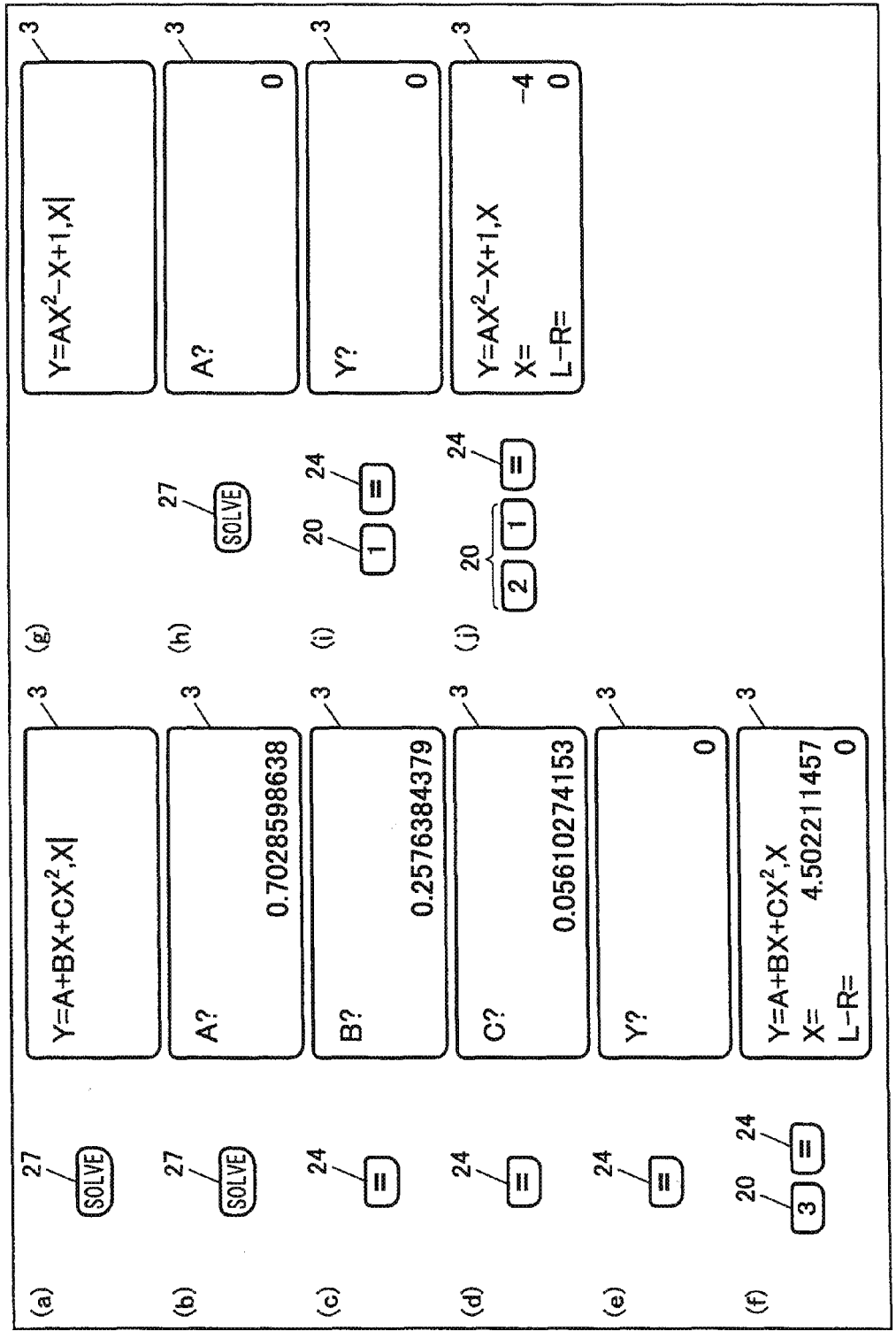

After the operations in FIG. 6(*a*) to (*e*), if the user presses the "SOLVE" key 27 as the operation for starting the calculation of a solution as illustrated in FIG. 8(*a*) (Step S9), the quadratic regression formula is displayed (Step S10).

If the user then presses the "SOLVE" key 27, the "=" key 24, and the "=" key 24 in this order as illustrated in FIG. 8(*b*) to (*d*), the names and the values of the coefficients A, B, and C are displayed in the alphabetical order (Steps S43 to S49).

If the user then presses the "=" key 24 as illustrated in FIG. 8(*e*), the dependent variable name Y is displayed (Step S49).

In the operations in FIG. 8(*b*) to (*e*), the menu may be changed automatically on a periodic basis (for example, every two seconds) instead of key operations by the user.

If the user then presses the numerical key 20 (3) and the "=" key 24 in this order as illustrated in FIG. 8(*f*), the input of a dependent variable value is received from the user (Step S47). The result of the calculation of the independent variable value is displayed on the basis of the values of the coefficients A, B, and C and the dependent variable (Step S50).

If the user presses the "SOLVE" key 27 as the operation for starting the calculation of a solution without performing the operation for starting the regression calculation function (Step S41), the equation, which has preliminarily been inputted by the user, is displayed as illustrated in FIG. 8(*g*) (Step S42).

If the user then presses the "SOLVE" key 27, the numerical key 20 (1), the "=" key 24, the numerical key 20 (21), and the "=" key 24 in this order as illustrated in FIG. 8(*h*) to (*j*), the names of the coefficients A, B, and C are displayed from the head in the appearance order (Steps S43 to S49), the input of a value of the coefficient is received from the user every time the name of the coefficient is displayed (Step S47), and input of a dependent variable value is then received from the user (Step S47). The independent variable value is then calculated on the basis of the values of the coefficients A, B, and C and the dependent variable, and the result of the calculation is displayed (Step S50).

Figure 9:
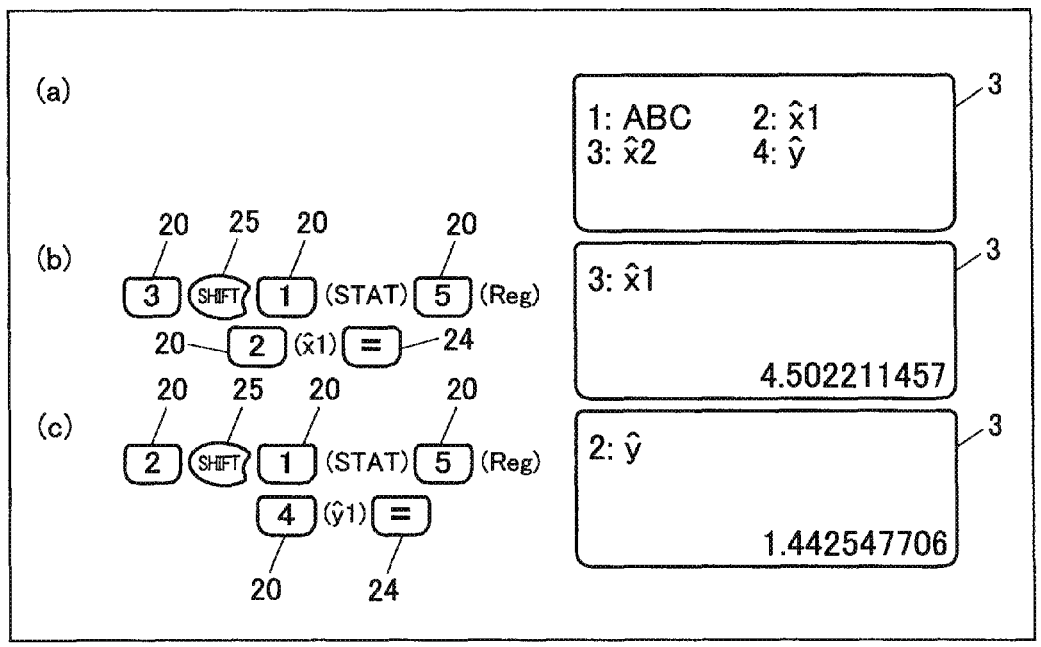

In Operational Examples 1 and 2, if the user performs the operation for displaying the statistical function list after the operations in FIG. 6(*a*) to (*e*) (Step S12), a menu is displayed for selection of the display of the coefficient value list or the calculation of the independent variable X or the dependent variable Y as illustrated in FIG. 9(*a*) (Step S13).

If the user then presses the numerical key 20 (3), the "SHIFT" key 25, the numerical key 20 (1), the numerical key 20 (5), the numerical key 20 (2), and the "=" key 24 in this order as illustrated in FIG. 9 (*b*), the result of the calculation of the independent variable value X is displayed for the dependent variable Y=3.

If the user presses the numerical key 20 (2), the "SHIFT" key 25, the numerical key 20 (1), the numerical key 20 (5), the numerical key 20 (4), and the "=" key 24 in this order as illustrated in FIG. 9 (*c*), the result of the calculation of the dependent variable value Y is displayed for the independent variable X=2.

According to the present embodiment, if the values of coefficients of the regression formula selected by the user are calculated and the operation for starting the calculation of the coefficients is performed, the regression formula and the values of the coefficients are displayed and the input of the independent variable value is received from the user to display the results of the calculation, as illustrated in, for example, Steps S4 to S8 in FIG. 3, Steps S23 to S30 in FIG. 4, and FIG. 7 (*a*) to (*f*). As a result, the user can check the selected regression formula through simple operations, then view the relationship between the selected regression formula, the values of the coefficients obtained through the regression calculation, the inputted variable, and the estimated value of the corresponding variable, and calculate the estimated value with the comprehension of this relationship.

In this case, the regression formula selected by the user is read from the regression formula table 13*b* and is displayed as illustrated in, for example, Step S7 in FIG. 3 and FIG. 7(*a*). As a result, the user can immediately view the selected regression formula.

As illustrated in, for example, Steps S23 to S29 in FIG. 4, FIG. 7(*h*) to (*j*), and FIG. 7(*b*) to (*d*), if the target of the operation for starting calculation of coefficients is a mathematical formula including coefficients, the names of the coefficients are displayed from the head in the appearance order; and if the target of the operation for starting calculation of coefficients is a regression formula, the names and the values of the coefficients are displayed in the alphabetical order. As a result, the user can also view the coefficients without mistakes.

In addition, if the values of coefficients of the regression formula selected by the user are calculated and the operation for starting calculation of the solution is performed, the regression formula and the values of the coefficients are displayed and the input of the dependent variable value is received from the user to display the independent variable value, as illustrated in, for example, Steps S4 to S6 and S9 to S11 in FIG. 3, Steps S43 to S50 in FIG. 5, and FIG. 8(*a*) to (*f*). As a result, the user can check the selected regression formula through simple operations, then view the relationship between the selected regression formula, the values of the coefficients obtained through the regression calculation, the inputted variable, and the estimated value of the corresponding variable, and calculate the estimated value with the comprehension of this relationship.

In this case, the regression formula selected by the user is read from the regression formula table 13*b* and is displayed as illustrated in, for example, Step S10 in FIG. 3 and FIG. 8 (*a*). As a result, the user can immediately view the selected regression formula.

As illustrated in, for example, Steps S43 to S49 in FIG. 5, FIGS. 8 (*h*) and (*b*) to (*d*), if the target of the operation for starting calculation of a solution is an equation inputted by the user, the names of the coefficients are displayed from the head in the appearance order; and if the target of the operation for starting calculation of a solution is a regression formula, the names and the values of the coefficients are displayed in the alphabetical order. As a result, the user can also view the names and the values of the coefficients without mistakes.

The present invention can also be applicable to any other embodiment other than the above embodiments. Proper modifications can be applied without departing from the scope and spirit of the present invention.

For example, although the computing device according to the present invention has been described as the scientific electronic calculator 1, the device to which the present invention is applicable is by no means limited to such a product but the present invention is generally applicable to the electronic devices such as mobile telephones, personal computers, tablet terminals (including smart phones), personal digital assistants (PDAs), and game machines. The function calculation processing program 13a according to the present invention may be stored in any external information storage medium which is removable from the scientific electronic calculator 1.

The scope of the present invention should not be limited to the embodiments described herein and include the scope of the accompanying claims and equivalents thereof.

The entire disclosure of Japanese Patent Application No. 2014-057497 filed on Mar. 20, 2014 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A computing device comprising a display, a memory and a processor, wherein
   the processor computes a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient,
   (1) when a starting operation of calculation of a formula including a coefficient is performed in a state where the computed value of the coefficient is displayed on the display, the processor sets the mathematical formula included in the regression formula as the formula including the coefficient; sets the computed value of the coefficient as the value of the coefficient of the formula including the coefficient; and computes the numerical value of the set formula including the coefficient and displays the numerical value on the display when the computed value of the coefficient and a numerical value of the independent variable which is input by a user's operation are substituted to the set formula including the coefficient,
   (2) when the starting operation of calculation of a formula including a coefficient is not performed in a state where the computed value of the coefficient is displayed on the display, and the starting operation of calculation of a formula including a coefficient is performed after a formula is input by a user's operation, the processor sets the formula input by a user's operation as a formula including a coefficient input by a user; sets a value of coefficient input by a user's operation as the value of the coefficient of the formula including the coefficient input by a user; computes the numerical value of the set formula including the coefficient input by a user and displays the numerical value on the display when the value of the coefficient input by a user's operation is substituted to the set formula including the coefficient input by a user.

2. The computing device according to claim 1, wherein
   a plurality of types of regression formulae are stored in the memory; and
   a regression calculation control performed by the processor selects, according to a user operation, a regression formula from the plurality of types of regression formulae stored in the memory, and reads the mathematical formula included in the selected regression formula from the memory to display on the display, when the computed value of the coefficient is displayed on the display.

3. The computing device according to claim 1, wherein, when the computed value of the coefficient is displayed on the display, the mathematical formula included in the regression formula is displayed on the display.

4. The computing device according to claim 1, wherein
   (1) when the starting operation of calculation of a formula including a coefficient is performed in a state where the computed value of the coefficient is displayed on the display, the processor displays on the display the computed value of the coefficient set as the value of the coefficient,
   (2) when the starting operation of calculation of a formula including a coefficient is not performed in a state where the computed value of the coefficient is displayed on the display, and the starting operation of calculation of a formula including a coefficient is performed after a formula is input by a user's operation, the processor accepts an input of a value of coefficient in a state where the value of coefficient is reset to zero and displayed on the display.

5. The computing device according to claim 1, wherein
   the processor displays the computed value of the coefficient in an alphabetical order of the coefficient when the computed value of the coefficient is substituted to the set formula including the coefficient, and
   the processor displays the computed value of the coefficient in an appearance order of the coefficient in the formula including the coefficient input by a user when the value of coefficient input by a user's operation is substituted to the set formula including the coefficient input by a user.

6. A computing device comprising a display, a memory and a processor, wherein
   the processor computes a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient,
   (1) when a starting operation of calculation of a solution is performed in a state where the computed value of the coefficient is displayed on the display, the processor sets the mathematical formula included in the regression formula as a formula whose solution is to be calculated; sets the computed value of the coefficient as the value of the coefficient of the formula whose solution is to be calculated; and calculates the solution of the set formula whose solution is to be calculated and displays the solution on the display when the computed value of the coefficient and a numerical value of the dependent variable which is input by a user's operation are substituted to the set formula whose solution is to be calculated, (2) when the starting operation of calculation of a solution is not performed in a state where the computed value of the coefficient is displayed on the display, and the starting operation of calculation of a solution is performed after a formula is input by a user's operation, the processor sets the formula input by a user's operation as a formula input by a user whose solution is to be calculated; sets a value of coefficient input by a user's operation as the value of the coefficient of the formula input by a user whose solution is to be calculated; and solve the set formula input by a user whose solution is to be calculated and displays the solution on the display when the value of the coefficient input by a user's operation and a numerical value of the dependent variable input by a user's operation are substituted to the set formula input by a user whose solution is to be calculated.

7. The computing device according to claim 6, wherein a plurality of types of regression formulae are stored in the memory; and
a regression calculation control performed by the processor selects, according to a user operation, a regression formula from the plurality of types of regression formulae stored in the memory, and reads the selected regression formula from the memory to display on the display, when the computed value of the coefficient is displayed on the display.

8. The computing device according to claim 6, wherein, when the computed value of the coefficient is displayed on the display, the mathematical formula included in the regression formula is displayed on the display.

9. The computing device according to claim 6, wherein
the processor displays the computed value of the coefficient in an alphabetical order of the coefficient when the computed value of the coefficient is substituted to the set formula whose solution is to be calculated, and
the processor displays the value of the coefficient input by a user's operation in an appearance order of the coefficient in the formula input by a user's operation including the coefficient when the value of coefficient input by a user's operation is substituted to the set formula input by a user's operation.

10. A computing method using a display, a memory and a processor, the computing method comprising
the processor computing a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient, (1) when a starting operation of calculation of a formula including a coefficient is performed in a state where the computed value of the coefficient is displayed on the display, the processor sets the mathematical formula included in the regression formula as the formula including the coefficient; sets the computed value of the coefficient as the value of the coefficient of the formula including the coefficient; and computes the numerical value of the set formula including the coefficient and displays the numerical value on the display when the computed value of the coefficient and a numerical value of the independent variable which is input by a user's operation are substituted to the set formula including the coefficient, (2) when the starting operation of calculation of a formula including a coefficient is not performed in a state where the computed value of the coefficient is displayed on the display, and the starting operation of calculation of a formula including a coefficient is performed after a formula is input by a user's operation, the processor sets the formula input by a user's operation as a formula including a coefficient input by a user; sets a value of coefficient input by a user's operation as the value of the coefficient of the formula including the coefficient input by a user; computes the numerical value of the set formula including the coefficient input by a user and displays the numerical value on the display when the value of the coefficient input by a user's operation is substituted to the set formula including the coefficient input by a user.

11. The method according to claim 10, wherein, when the computed value of the coefficient is displayed on the display, the mathematical formula included in the regression formula is displayed on the display.

12. The method according to claim 10, wherein
(1) when the starting operation of calculation of a formula including a coefficient is performed in a state where the computed value of the coefficient is displayed on the display, the processor displays on the display the computed value of the coefficient set as the value of the coefficient, (2) when the starting operation of calculation of a formula including a coefficient is not performed in a state where the computed value of the coefficient is displayed on the display, and a starting operation of calculation of a formula including a coefficient is performed after a formula is input by a user's operation, the processor accepts an input of a value of coefficient in a state where the value of coefficient is reset to zero and displayed on the display.

13. The method according to claim 10, wherein
a plurality of types of regression formulae are stored in the memory; and
a regression calculation control performed by the processor selects, according to a user operation, a regression formula from the plurality of types of regression formulae stored in the memory, and reads the mathematical formula included in the selected regression formula from the memory to display on the display, when the computed value of the coefficient is displayed on the display.

14. The method according to claim 10, wherein
the processor displays the computed value of the coefficient in an alphabetical order of the coefficient when the computed value of the coefficient is substituted to the set formula including the coefficient, and
the processor displays the computed value of the coefficient in an appearance order of the coefficient in the formula including the coefficient input by a user when the value of coefficient input by a user's operation is substituted to the set formula including the coefficient input by a user.

15. A computing method using a display, memory and a processor, the computing method comprising the processor computing a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient, (1) when a starting operation of calculation of a solution is performed in a state where the computed value of the coefficient is displayed on the display, the processor sets the mathematical formula included in the regression formula as a formula whose solution is to be calculated; sets the computed value of the coefficient as the value of the coefficient of the formula whose solution is to be calculated; and calculates the solution of the set formula whose solution is to be calculated and displays the solution on the display when the computed value of the coefficient and a numerical value of the dependent variable which is input by a user's operation are substituted to the set formula whose solution is to be calculated, (2) when the starting operation of calculation of a solution is not performed in a state where the computed value of the coefficient is displayed on the display, and the starting operation of calculation of a solution is performed after a formula is input by a user's operation, the processor sets the formula input by a user's operation as a formula input by a user whose solution is to be calculated; sets a value of coefficient input by a user's operation as the value of the coefficient of the formula input by a user whose solution is to be calculated; and solve the set formula input by a user whose solution is to be calculated and displays the solution on the display when the value of the coefficient input by a user's operation and a numerical value of the dependent variable input by a user's operation are substituted to the set formula input by a user whose solution is to be calculated.

16. The method according to claim 15, wherein, when the computed value of the coefficient is displayed on the display, the mathematical formula included in the regression formula is displayed on the display.

17. The method according to claim 15, wherein
a plurality of types of regression formulae are stored in the memory; and
a regression calculation control performed by the processor selects, according to a user operation, a regression formula from the plurality of types of regression formulae stored in the memory, and reads the selected regression formula from the memory to display on the display, when the computed value of the coefficient is displayed on the display.

18. The method according to claim 15, wherein
the processor displays the computed value of the coefficient in an alphabetical order of the coefficient when the computed value of the coefficient is substituted to the set formula whose solution is to be calculated, and
the processor displays the value of the coefficient input by a user's operation in an appearance order of the coefficient in the formula input by a user's operation including the coefficient when the value of coefficient input by a user's operation is substituted to the set formula input by a user's operation.

19. A non-transitory computer-readable recording medium on which is recorded a program for causing a computing device comprising a display, a memory and a processor to execute the following operations:

the processor computes a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient, (1) when a starting operation of calculation of a formula including a coefficient is performed in a state where the computed value of the coefficient is displayed on the display, the processor sets the mathematical formula included in the regression formula as the formula including the coefficient; sets the computed value of the coefficient as the value of the coefficient of the formula including the coefficient; and computes the numerical value of the set formula including the coefficient and displays the numerical value on the display when the computed value of the coefficient and a numerical value of the independent variable which is input by a user's operation are substituted to the set formula including the coefficient, (2) when the starting operation of calculation of a formula including a coefficient is not performed in a state where the computed value of the coefficient is displayed on the display, and the starting operation of calculation of a formula including a coefficient is performed after a formula is input by a user's operation, the processor sets the formula input by a user's operation as a formula including a coefficient input by a user; sets a value of coefficient input by a user's operation as the value of the coefficient of the formula including the coefficient input by a user; computes the numerical value of the set formula including the coefficient input by a user and displays the numerical value on the display when the value of the coefficient input by a user's operation is substituted to the set formula including the coefficient input by a user.

20. A non-transitory computer-readable recording medium on which is recorded a program for causing a computing device comprising a display, a memory and a processor to execute the following operations:

the processor computes a value of a coefficient of a regression formula including a mathematical formula of the coefficient and an independent variable, wherein the regression formula describes a relation between the independent variable and a dependent variable from sets of numerical value data of the independent variable and the dependent variable which are stored in the memory in response to a user's operation, and displays on the display the computed value of the coefficient, (1) when the starting operation of calculation of a solution is performed in a state where the computed value of the coefficient is displayed on the display, the processor sets the mathematical formula included in the regression formula as a formula whose solution is to be calculated; sets the computed value of the coefficient as the value of the coefficient of the formula whose solution is to be calculated; and calculates the solution of the set formula whose solution is to be calculated and displays the solution on the display when the computed value of the coefficient and a numerical value of the dependent variable which is input by a user's operation are substituted to the set formula whose solution is to be calculated, (2) when the starting operation of calculation of a solution is not performed in a state where the computed value of the coefficient is displayed on the display, and the starting operation of calculation of a solution is performed after a formula is input by a user's operation, the processor sets the formula input by a user's operation as a formula input by a user whose solution is to be calculated; sets a value of coefficient input by a user's operation as the value of the coefficient of the formula input by a user whose solution is to be calculated; and solve the set formula input by a user whose solution is to be calculated and displays the solution on the display when the value of the coefficient input by a user's operation and a numerical value of the dependent variable input by a user's operation are substituted to the set formula input by a user whose solution is to be calculated.

* * * * *